F. H. ROSE.

Assignor to VALENTINE & COMPANY.

SAMPLE OF PAINTS, &c.

No. 11,226. Reissued Feb. 23, 1892.

WITNESSES:

Chas. Nida.

Harold Binney

INVENTOR:

Frank H. Rose

BY

ATTORNEYS

THE NORRIS PETERS CO., PHOTO-LITHO., WASHINGTON, D. C.

UNITED STATES PATENT OFFICE.

FRANK H. ROSE, OF SYRACUSE, ASSIGNOR TO VALENTINE & COMPANY, OF NEW YORK, N. Y.

SAMPLE OF PAINTS, &c.

SPECIFICATION forming part of Reissued Letters Patent No. 11,226, dated February 23, 1892.

Original No. 402,859, dated May 7, 1889. Application for reissue filed December 4, 1890. Serial No. 373,616.

*To all whom it may concern:*

Be it known that I, FRANK H. ROSE, of Syracuse, in the county of Onondaga and State of New York, have invented a certain new and useful Improvement in Samples of Paints, &c., of which I declare the following to be a full, clear, and exact description, reference being had to the accompanying drawings, forming part of this specification.

This invention is in the nature of an improvement in samples of colors or pigments, by means of which the colors may be sold; and the invention consists of color samples constructed, applied, and combined in the manner herein described and claimed.

Figure 1:
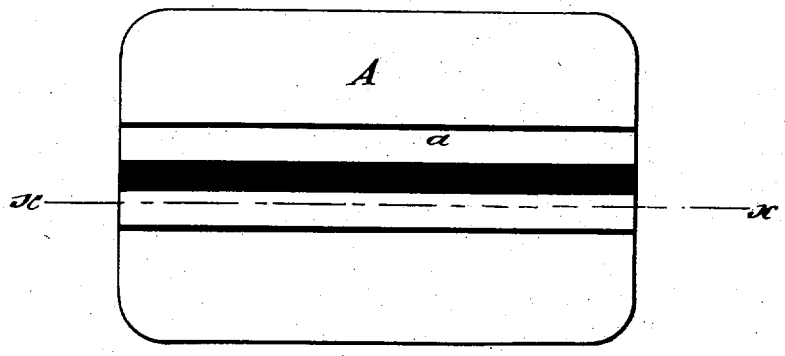
Figure 2:
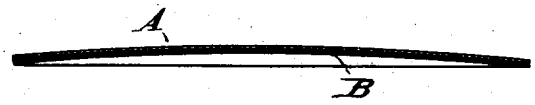
Figure 3:
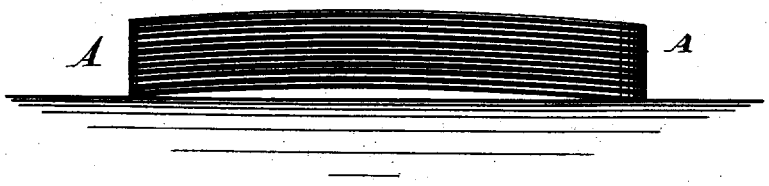

In the accompanying sheet of drawings, Figure 1 is a view of the top side or face of the sample. Fig. 2 is a longitudinal section thereof in the plane *x x*, Fig. 1. Fig. 3 is an edge view of several samples superimposed one upon another.

Similar letters of reference indicate like parts in the several views.

To properly sell colors or pigments for painters' use is a matter of no little difficulty. Samples of pigments in a dry state, or when ground in japan, varnish, gold-size, oil, or other liquids, do not present the same tints or shades that appear after the colors have been applied by the painter and the work finished in the usual manner by being rubbed down and varnished. Besides the difficulty of conveying numerous samples of ground colors, dry or liquid, in satisfactory form, or in packages suitable to be carried about and exhibited to customers, is well known. To enable, therefore, salesmen of colors to exhibit their wares under the best possible conditions of portability, handling, and displaying the colors in forms to exhibit at once their merits under the best of circumstances is the principal object, of my present invention, and to accomplish this I employ glass plates A to some extent, with a convex surface on one side and concave surface on the other. These plates may be of any convenient dimensions. To the under or concave sides of the plates is applied the paint ground in oil and laid on the glass surface in one or more smooth and even coats. The result of this application of the paint to the glass is that the color being laid next to the smooth vitreous surface the same effect is produced on the surface of the color as if that surface had been rubbed down or pumiced, excepting that it is not dull, and when this surface is seen through the convex face of the plate A the precise effect of a varnished surface is imparted to the paint on the under surface of the plate, so that all the effect of the application of the paint smoothed down and varnished is had and the merits of the color under the most advantageous circumstances discovered by a glance at the plate. Before applying a ground color, for instance, to the plate the plate may be ornamented to show the effect of striping *a*, or otherwise, in contrast with the ground color.

The object attained by making the surface of the glass concavo-convex is twofold. The convex surface affords a play of light, such as is produced on the curved, painted, and polished surface of a coach-body. The second purpose is to utilize the concave surface to receive a backing B of some textile material, which not only protects the painted surface on the plate A, but shields that plate from accidental breaking to some extent, and, in addition, permits the superimposing of one plate on another, whereby a convenient stack of samples may be formed without danger of scratching the convex surfaces of the curved plates and so marring their polish. This backing B is glued or in any other convenient way fixed in place. When a number of glass plates are suitably prepared substantially in the manner above described, they may be placed in a suitable box or covering and thus a salesman is enabled to carry about with him a large number of color samples in a most convenient form.

Having now described my invention, what I claim as new, and desire to secure by Letters Patent, is—

1. As an article of manufacture, a color sample consisting of a concavo-convex transparent plate with color, pigment, or like material to be exhibited applied to the concave surface for the purpose of protection, nesting, and displaying, substantially as set forth.

2. As an article of manufacture, a color sample consisting of a concavo-convex plate of glass or like substance, the curvature being such that substantially none of its elements are rectilinear, and color, pigment, or other material to be exhibited applied to the concave surface for the purposes of protection, displaying, and packing, substantially as set forth.

3. Color samples consisting of concavo-convex transparent plates A, having colors applied to the concave surfaces thereof, and textile backings B, covering the colors and conforming to the adjacent surfaces of the plates, the said samples being uniformly constructed as to size and curvature, thus permitting the convex surface of each plate, when the samples are placed in a stack or nested, to fit snugly within the concave surface of the backing of the plate above it, substantially as and for the purposes set forth.

In testimony hereof I affix my signature this 28th day of November, 1890.

FRANK H. ROSE.

Witnesses:
E. S. TEFFT,
MILLS STRYKER.